United States Patent
Law et al.

(10) Patent No.: US 6,868,684 B2
(45) Date of Patent: Mar. 22, 2005

(54) BLOCK VALVE WITH INTEGRAL REFRIGERANT LINES

(75) Inventors: Scott P. Law, Newark, NY (US); Frank L. Petrosino, Vanzago (IT)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/729,079

(22) Filed: Dec. 5, 2003

(65) Prior Publication Data

US 2004/0112974 A1 Jun. 17, 2004

Related U.S. Application Data

(60) Provisional application No. 60/434,216, filed on Dec. 17, 2002.

(51) Int. Cl.[7] .............................................. F25B 41/04
(52) U.S. Cl. ........................................ 62/225; 236/92 B
(58) Field of Search ....................... 236/92 B; 62/222, 62/77, 259.1, 210, 225

(56) References Cited

U.S. PATENT DOCUMENTS

| | | | |
|---|---|---|---|
| 3,414,014 A | 12/1968 | Merchant et al. | |
| 3,450,345 A | 6/1969 | Orth et al. | |
| 3,537,645 A | 11/1970 | Treder | |
| 3,691,783 A | 9/1972 | Proctor | |
| 3,699,778 A | 10/1972 | Orth | |
| 3,858,406 A * | 1/1975 | Izumi | 62/210 |
| 3,929,356 A | 12/1975 | DeVincent et al. | |
| 4,095,742 A | 6/1978 | Schumacher | |
| 4,450,618 A | 5/1984 | Ridenour | |
| 4,508,135 A | 4/1985 | Schlesch et al. | |
| 4,593,535 A * | 6/1986 | Ikeda et al. | 62/217 |
| 4,635,537 A | 1/1987 | Field | |
| 4,707,999 A | 11/1987 | Ohta et al. | |
| 4,852,364 A | 8/1989 | Seener et al. | |
| 4,984,735 A | 1/1991 | Glennon et al. | |
| 5,269,459 A | 12/1993 | Thompson et al. | |
| 5,341,566 A * | 8/1994 | Quitschau et al. | 29/890.035 |
| 5,354,103 A | 10/1994 | Torrence et al. | |
| 5,467,611 A | 11/1995 | Cummings et al. | |
| 5,555,739 A * | 9/1996 | Kujirai et al. | 62/244 |
| 5,588,590 A * | 12/1996 | Sakakibara et al. | 236/92 B |
| 5,596,881 A | 1/1997 | Wilson et al. | |
| 5,724,817 A * | 3/1998 | Nishishita | 62/216 |
| 6,116,574 A * | 9/2000 | Petersen | 62/324.6 |
| 6,185,959 B1 * | 2/2001 | Zajac | 62/527 |
| 6,223,994 B1 | 5/2001 | Fukuda et al. | |
| 6,321,995 B1 | 11/2001 | Badovick et al. | |
| 6,354,509 B1 | 3/2002 | Fukuda et al. | |
| 6,425,528 B2 * | 7/2002 | Hirota et al. | 236/92 B |
| 6,443,224 B2 * | 9/2002 | Sasaki | 165/178 |

FOREIGN PATENT DOCUMENTS

| | | | |
|---|---|---|---|
| EP | 1203917 | | 5/2002 |
| FR | 2757613 | | 6/1998 |
| GB | 2073391 A | * | 10/1981 |

* cited by examiner

*Primary Examiner*—William E. Tapolcai
*Assistant Examiner*—Mohammad M. Ali
(74) *Attorney, Agent, or Firm*—Joseph J. Pophal

(57) ABSTRACT

A refrigerant assembly includes a block-type thermostatic expansion valve and one or more refrigerant tubes. The body of the block valve has a port extending inwardly from one surface, and a refrigerant tube is received in the port. The refrigerant tube includes an annular bead, which is closely received within a counterbore coaxial with the bore. The surface of the body surrounding the counterbore is then mechanically deformed, preferably by staking, around the entire circumference of the refrigerant tube such that body material is forced radially inward toward the tube. The body material at least partially encloses the refrigerant tube bead within the counterbore to secure the refrigerant tube to the valve body. A sharp edge between the counterbore and bore is forced against the junction between the bead and the refrigerant tube to provide a fluid tight seal.

5 Claims, 3 Drawing Sheets

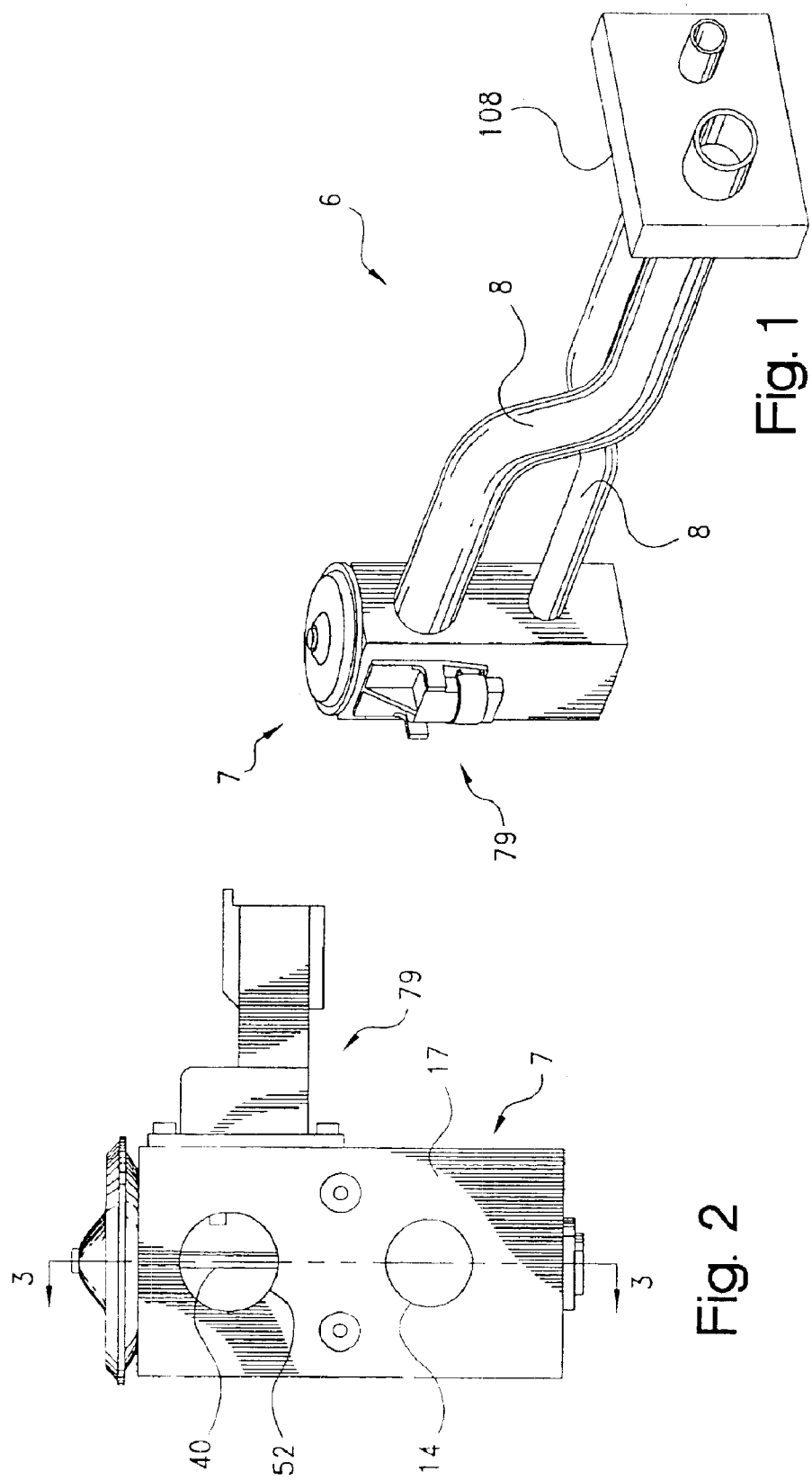

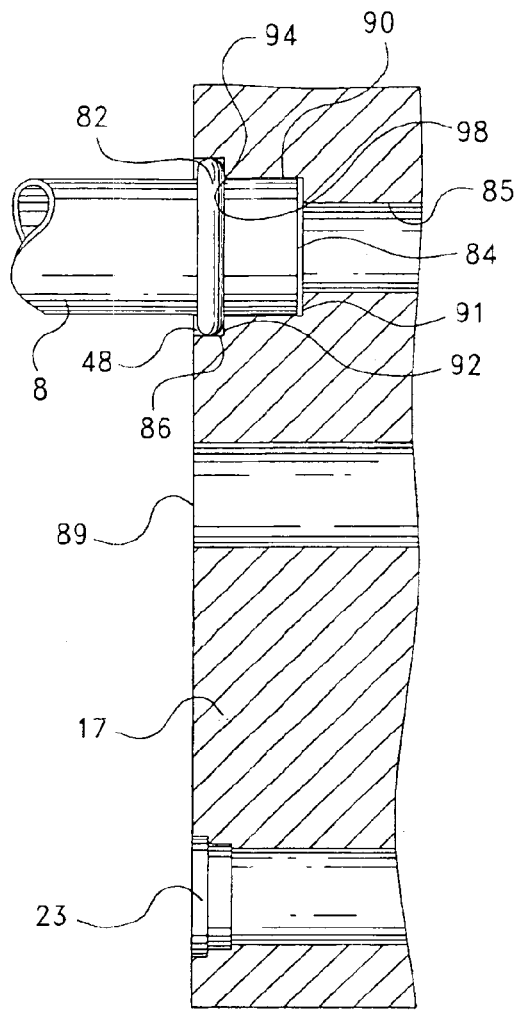
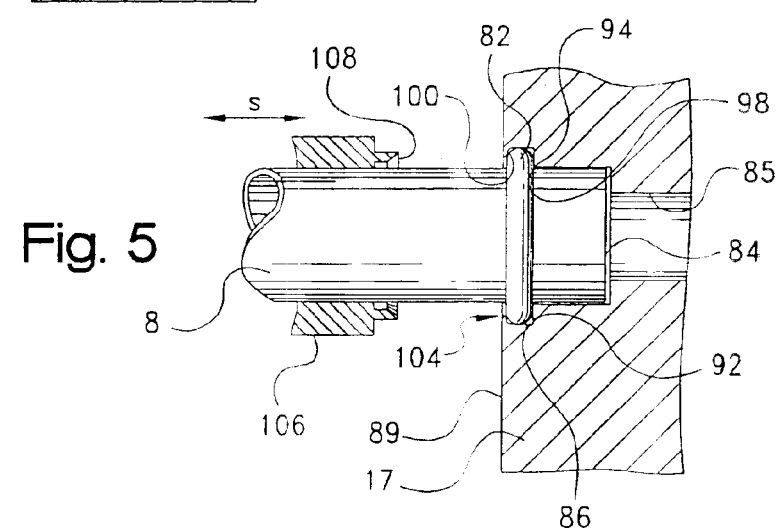

BLOCK VALVE WITH INTEGRAL REFRIGERANT LINES

CROSS-REFERENCE TO RELATED CASES

The present application claims the benefit of the filing date of U.S. Provisional Application Ser. No. 60/434,216 filed Dec. 17, 2002, the disclosure of which is incorporated herein by reference.

FIELD OF THE INVENTION

The present invention relates to a method for attaching a refrigerant tube to the body of a thermostatic expansion valve in a refrigeration system.

BACKGROUND OF THE INVENTION

In a typical vehicle air-conditioning system, refrigerant is compressed by a compressor unit driven by the automobile engine. The compressed refrigerant, at high temperature and pressure, enters a condenser where heat is removed from the compressed refrigerant. The refrigerant then travels through a receiver/dryer to an expansion valve. The expansion valve throttles the refrigerant as it flows through a valve orifice, which causes the refrigerant to change phase from liquid to a saturated liquid/vapor mixtures as it enters the evaporator. In the evaporator, heat is drawn from the environment to replace the latent heat of vaporization of the refrigerant, thus cooling the environmental air. The low-pressure refrigerant flow from the evaporator returns to the suction side of the compressor to begin the cycle anew.

The high pressure refrigerant flow through the expansion valve must be regulated in response to the degree of superheat of the refrigerant flow between the evaporator and suction side of the compressor to maximize the performance of the air-conditioning system. The superheat is defined as the temperature difference between the actual temperature of the low-pressure refrigerant flow and the temperature of evaporation of the flow.

Thermostatic expansion valves typically include a power element comprising a diaphragm mounted between a domed head and a support cup on the valve body. A "charge" is located within a head chamber defined by the domed head and one (upper) surface of the diaphragm. The support cup and the other (lower) surface of the diaphragm define a diaphragm chamber with the body of the expansion valve. A valve stem extends downwardly from the diaphragm through a bore in the valve body to a valve element modulating a valve orifice between a first port in the valve body (to the condenser) and a second port in the valve body (to the evaporator).

To control the refrigerant flow, the diaphragm in the power element moves in response to the refrigerant condition exiting the evaporator and compensates the flow rate to the evaporator by opening or closing the valve orifice.

A trend in the industry is toward block-type ("bulbless") thermostatic expansion valves. In such valves, the outlet flow from the evaporator is directed back through the block valve and is used to regulate the response of the diaphragm. In certain bulbless valves, a thermally conductive pressure pad is located against the lower surface of the diaphragm. As the refrigerant passes around the pressure pad, heat energy is transferred by conduction through the pad to the refrigerant charge in the head chamber above the diaphragm valve. A portion of the diaphragm surrounding the pressure pad is typically also exposed and in direct contact with the refrigerant. Refrigerant pressure from the evaporator outlet against the diaphragm along with the force of an adjustment spring on the valve element tends to close the valve, while pressure from the charge tends to open the valve. The balance of forces across the diaphragm along with the spring constant of the diaphragm determine the deflection of the diaphragm and hence the opening of the expansion valve orifice between the condenser and evaporator. The diaphragm deflects as appropriate to maintain a balance between these forces.

Glennon et al., U.S. Pat. No. 4,984,735; Fukuda, U.S. Pat. No. 6,223,994; Proctor, U.S. Pat. No. 3,691,783; Treder, U.S. Pat. No. 3,537,645; and Orth, U.S. Pat. No. 3,450,345, show and describe examples of block-type bulbless expansion valves such as described above.

There are numerous techniques known for attaching the refrigerant tubes from the various components to the block valve such that fluid can be directed into or out of the valve. One technique is to insert the tube into a bore in the block and secure the tube such as by soldering, welding, or brazing. This technique is shown in U.S. Pat. No. 4,095,742. Alternatively, a fitting can first be attached to the valve block with cooperating threads, such as shown in U.S. Pat. No. 3,450,345; or by soldering, welding or brazing, such as shown in U.S. Pat. No. 4,852,364, and the tube can then be attached to the fitting (such as by friction fit, cooperating threads, flared flange, etc.).

It is also known to form an annular bead toward the end of the tube, and locate the bead within a counterbore formed in the block valve. An O-ring type seal can be located between the bead and the shoulder to fluidly seal the tube in the bore. A retaining plate with appropriately-sized openings is received around the tube and is fastened such as by a bolt to the block valve. This technique is shown in U.S. Pat. No. 5,269,459.

While the above techniques can be useful in certain situations to attach a tube to a block valve, they are not without drawbacks. Providing a fitting for example, requires a separate component with its own material, machine steps, and stock-keeping costs. A retaining plate also requires additional material, machining steps and stock-keeping costs. Forming threads on the block valve is also a time-consuming step. Soldering, welding and brazing raise environmental concerns.

Thus, it is believed that there is a demand in the industry for an effective and efficient technique for attaching a fluid tube to a block valve which reduces material waste, machining steps, stock-keeping units, and which does not raise environmental concerns.

SUMMARY OF THE INVENTION

The present invention provides a new and useful technique to attach a refrigerant tube to the block valve of a refrigeration system. The technique reduces material waste, machining steps, stock-keeping units, and does not raise environmental concerns. According to the present invention, the tube includes an annular bead formed toward the end of the tube. The block valve includes a bore, which is dimensioned to closely receive the end of the tube. The bore includes a counterbore extending outwardly to the surface of the block valve, and which is dimensioned to closely receive the bead on the tube. The counterbore and bore define an annular shoulder with an inner sharp edge, which engages the junction between the bead and the end of the tube when the tube is inserted within the bore.

An O-ring can also be provided between the bead and the annular shoulder, if necessary or desirable.

The refrigerant tube is attached to the end cap or wall by forcing a die against the surface of the block surrounding the bore and mechanically deforming (staking) the surface material inwardly against the bead. The surface is formed entirely around the bead and almost entirely encloses the bead within the counterbore. The staking operation causes the sharp shoulder in the bore to be forced against the junction between the bead and the end of the tube to provide a fluid tight connection. This operation can be replicated for all the refrigerant tubes to and from the block valve.

The block valve with attached refrigerant tube(s) can then be connected within a refrigeration system, in any conventional manner known in the art.

The present invention thereby provides a simple technique for providing a connection between a refrigerant tube and a block valve. The connection is fluid-tight and is provided in essentially a single machining (staking) step. There are no separate components, which reduces machining, material and stock-keeping costs. The staking is also an environmentally "friendly" step, as there is no generated emissions or wasted material.

Further features and advantages of the present invention will become apparent upon reviewing the following specification and accompanying drawings.

BRIEF DESCRIPTION OF THE DRAWINGS

FIG. 1 is an elevated perspective view of a thermostatic expansion valve and refrigerant tube assembly constructed according to the principles of the present invention;

FIG. 2 is a side view of the block valve of FIG. 1;

FIG. 4 is a cross-sectional side view of the block valve, illustrating the refrigerant tube located within a bore of the valve during an initial step of assembly; and FIG. 5 is a view similar to a portion of FIG. 4, showing a further step for attaching the tube to the block valve.

DETAILED DESCRIPTION OF THE PREFERRED EMBODIMENT

Figure 3:
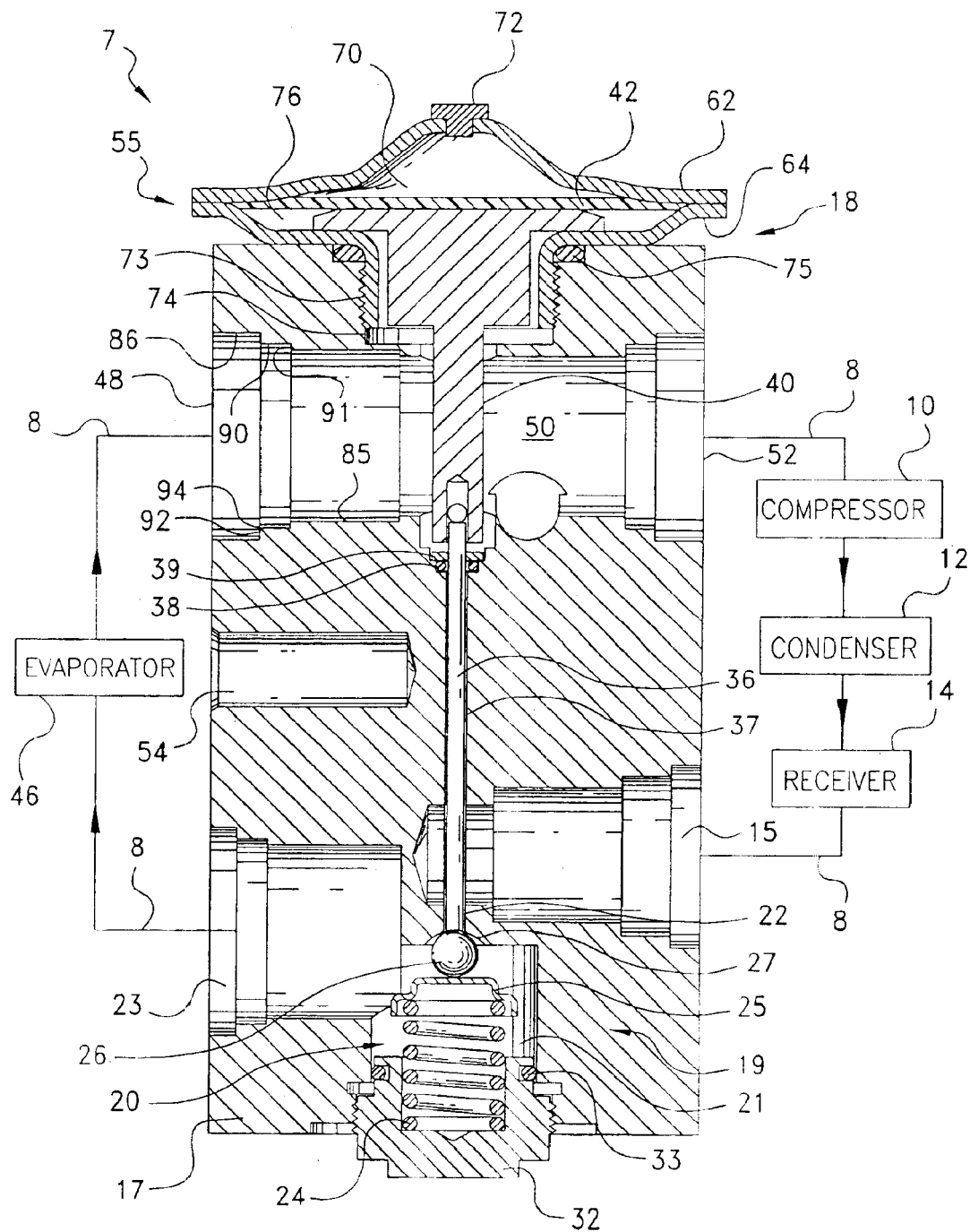
FIG. 3 is a cross-sectional side view of the block valve taken substantially along the plane described by the lines 3—3 of FIG. 2, schematically illustrating the block valve incorporated into a refrigeration system.

Referring to the drawings and initially to FIGS. 1 and 2, a valve assembly for a refrigeration system is indicated generally at 6. The valve assembly comprises a thermostatic expansion valve, indicated generally at 7 and one or more tubes 8 which fluidly connect the thermostatic expansion valve 7 in a refrigeration system.

Referring now to FIG. 3, refrigerant in an air-conditioning system flows from compressor 10 to condenser 12 and from the condenser to either a receiver/dryer 14 or directly into inlet port 15 of the thermostatic expansion valve 6. The body 17 of the thermostatic expansion valve has a control sensing section, indicated at 18, and a metering section, indicated at 19. A ball-type valve assembly, indicated generally at 20, is disposed in a cavity 21 of the metering section and controls the flow through a metering passage 22 defined between inlet port 15 (condenser outlet) and outlet port 23 (evaporator inlet). Valve assembly 20 includes a spring 24 which biases a holder or cup 25 supporting a ball valve 26 against a valve seat 27 to meter refrigerant flow through passage 22. Spring 24 is supported within a spring seat 32, which is threadably connected to body 17, and sealed thereto by O-ring seal 33. Valve assembly 20 may be adjusted by turning spring seat 32 inwardly or outwardly in body 17.

The ball valve is actuated by push pin or stem 36 extending axially through the housing in close sliding relationship with an internal bore 37. An O-ring elastomeric seal 38 surrounds and fluidly seals stem 36 within bore 37, and is held in place by a ring 39. Stem 36 is, in turn, connected to a pressure pad 40, which is connected to diaphragm 42. Flow from the valve outlet port 23 in the metering section flows to evaporator 46 and then passes into inlet port 48 of the control sensing section of the body. Flow then passes through return passage 50, which fluidly interconnects inlet port 48 with outlet port 52, and then back through an evaporator outlet control valve (not shown), or directly into compressor 10.

The expansion valve described above is preferably a block-type valve formed from an appropriate material such as metal (e.g., aluminum alloy). The valve body 17 has a rectangular configuration typically with the inlet and outlet ports 15, 23 of the metering section 19 on two (typically opposite) side surfaces of the body 17 and located toward one end of the body; while the inlet and outlet ports 48, 52 of the control sensing section 18 are on the same side surfaces as inlet and outlet ports 23, 15 respectively, but are located toward the other end of body 17. Mounting holes 54 are also provided in the body for mounting the valve to appropriate fixtures in the system. It is noted that return passage 50 in control sensing section 18 typically extends laterally through body 17, or in other words, when expansion valve 7 is used in the vertical orientation illustrated in FIG. 3, passage 50 extends essentially horizontally through the valve.

A power element, indicated generally at 55, is provided integral with, and preferably mounted to one (upper) end surface of body 17. Power element 55 includes annular diaphragm 42, which is mounted between an annular domed head or upper housing portion 62, and an annular support cup or lower housing portion 64. Diaphragm 42 is preferably formed from a thermally-conductive material, such as metal (e.g., stainless steel), and is sealed around its periphery to domed head 62 and support cup 64, such as by welding or brazing. A head chamber 70 is defined between domed head 62 and one (upper) surface of diaphragm 42. Head chamber 70 is charged with a temperature-responsive charge through an aperture or capillary tube (not shown), and is then sealed off as with plug 72, or by other appropriate means.

On the other side of the diaphragm, support cup 64 has an annular collar 73, which is threaded into axial control passage 74 formed in the upper end of valve body 17 to mount the power element to the valve body. Axial control passage 74 is fluidly open at its inner end to lateral passage 50 extending between inlet port 48 and outlet port 52 in the control sensing section. An O-ring seal 75 surrounds and fluidly-seals the exterior of support cup 64 to body 17. The other (lower) surface of diaphragm 42 and support cup 64 define a diaphragm chamber 76. Diaphragm chamber 76 is in fluid communication with axial control passage 74.

The pressure pad 40 is preferably formed entirely from brass, and is in surface-to-surface engaging contact with the lower surface of diaphragm 42, and as such, is directly and closely thermally coupled to the diaphragm. Pressure pad 40 projects downwardly through axial control passage 74, and through return passage 50, and receives stem 36 of valve assembly 20 such that the pressure pad is operatively connected to the valve.

A portion of the refrigerant entering inlet port 48 from the evaporator outlet normally diverges from the flow path through passage 50 and flows through passage 74 into diaphragm chamber 76. Refrigerant in chamber 76 comes into direct contact with the pressure pad 40, as well as the lower surface of diaphragm 42 around the periphery of the pressure pad. The refrigerant then exits chamber 76 and passage 74 and rejoins the flow through passage 50 to pass through outlet port 52 to the compressor inlet. Refrigerant pressure from the evaporator outlet through port 48 and against the lower surface of pressure pad 40 and diaphragm 42, along with the force of the adjustment spring 24 on the valve element tends to force the ball valve against seat 27; while pressure from the charge in chamber 70, as influenced by the thermal transfer through the pressure pad 40 and the exposed portion of the diaphragm 42, tends to open the valve. The balance of forces across the diaphragm along with the spring constant of the diaphragm determine the deflection of the diaphragm and hence the opening of the expansion valve orifice between the condenser and evaporator. The diaphragm deflects as appropriate to maintain a balance between these forces.

A temperature sensor assembly, indicated generally at 79, can be mounted to the side of the valve body to facilitate sensing and controlling the refrigerant flowing through the block valve. One type of temperature sensor assembly appropriate for the present invention is shown and described in U.S. Pat. No. 4,984,735, which is incorporated herein by reference.

It is noted the thermostatic expansion valve described above is only one example of a block valve that can be used with the present invention, and that block valves with other arrangements of metering and control sections could likewise be used.

Referring now to FIGS. 4 and 5, the refrigerant tubes 8 are shown being attached to port 48 of the block valve, with preferably the same technique being used to attach the respective refrigerant tubes to all of ports 48, 52, 15 and 23. Each tube includes an annular bead 82 located proximate the distal end 84 of the tube and projecting radially outward essentially transverse to the longitudinal axis of the tube. Although the bead 82 is illustrated as being spaced a short distance from the distal end of the tube, the bead could also be formed directly at the distal end. The bead 82 is preferably formed using techniques, which are conventional in the art, for example an end-forming machine.

Tube 8 is closely received in the bore 85 defining port 48. Port 48 includes a first (co-axial) counterbore 86 (see also, FIG. 3) radially larger than bore 85, which extends inwardly into the end cap from surface 89. Counterbore 86 has an inner surface dimension which is substantially the same as the outer dimension of bead 82 on refrigerant tube 8, such that bead 82 can be closely received within counterbore 86. Counterbore 86 preferably extends axially into body 17 from surface 89 an amount which is slightly greater than the axial width of bead 82. Port 48 also preferably includes a second (co-axial) counterbore 90 also radially larger than bore 85 but radially smaller than first counterbore 86, extending inwardly from the first counterbore 86. Counterbore 90 has an inner surface dimension, which closely receives the distal end 84 of the refrigerant tube 8. The distal end 84 of refrigerant tube 8 preferably abuts or is closely proximate to an annular shoulder 91 formed between second counterbore 90 and bore 85. The techniques for forming port 48 and counterbores 86 and 90 in body 17 should be well known to those skilled in the art.

An annular flat shoulder 92 is defined between first counterbore 86 and second counterbore 90. Shoulder 92 preferably extends at right angles to counterbores 86 and 90, although shoulder 92 could be formed at an acute angle to both counterbore 86 and counterbore 90 to create a wedge-shaped annular lip. In any case, shoulder 92 has a sharp annular edge 94 at the juncture of counterbores 86 and 90. Edge 94 has a sharper radius than the radius of the junction 98 between the tube bead 82 and the end 84 of the tube 8. Preferably, the radius of convex edge 94 is about 5/1000 while the radius of the concave junction 98 is at least 20/1000. When refrigerant tube 8 is inserted axially into port 48 (from surface 89), edge 94 is forced against junction 98 around the entire circumference of bead 82.

As shown in FIG. 5, the surface 89 of body 17 surrounding counterbore 86 is mechanically deformed to tightly attach refrigerant tube 8 to the body. Preferably, the surface material is forced radially inwardly toward the tube and against outer surface 100 of bead 82. The deformed surface material, indicated generally at 104, substantially encloses bead 82 within the counterbore 86 around the entire circumference of the tube. The tube is retained tightly within the bore such that wobbling of the tube is prevented. Also, the mechanical deforming of the surface forces the bead upwardly within the bore such that the sharp annular edge 94 in the valve body is forced against junction 98 on tube 8. Because of the sharpness of edge 94 and the slightly harder temper of the valve body, the edge 94 of the valve body "bites," "cuts" or "indents" into the tube junction 98 such that a fluid-tight seal is provided between valve body 17 and the entire circumference of tube 8. It is believed in some cases this seal is sufficient to prevent fluid from leaking between the tube and valve body, although an elastomeric O-ring type seal can also be provided between the bead 82 and surface 92, if necessary or desirable.

The means for mechanically deforming the surface 89 of valve body 17 against bead 82 of refrigerant tube 8 preferably comprises a die tool 106 which is received around the refrigerant tube 8 and is then forced against the body material surrounding counterbore 86. The die 106 preferably includes an annular, wedge-shaped, carbon-tipped forward or striking head 108, which bites into the valve body and forces the valve body material radially inward toward the refrigerant tube 8. The die deforms ("stakes") valve body material 360 degrees around the entire periphery of tube 8. A space of at least about $200/1000$ inch is maintained between first counterbore 86 and the periphery of body 8 for strength reasons. Preferably, a single forward and return stroke (schematically represented by the arrow "S") are used to stake the end cap to the refrigerant tube. Preferably, the die applies about 1250 lbs. of pressure against the end cap. Die 106 can be incorporated within a conventional hydraulic or pneumatic cylinder assembly to affect the proper axial motion, as should be well known to those skilled in the art. After the die 106 finishes its return stroke and is removed from around refrigerant tube 8, the refrigerant tube can then be bent as appropriate so as to fit within the appropriate location in the engine compartment of the vehicle.

After all refrigerant tubes 8 are attached to valve body 17 and bent as appropriate, the distal end of the tubes can be secured by a retainer plate 108 (FIG. 1) in any conventional manner. Retainer plate 108 permits the tubes to be easily connected to fluid lines in the refrigeration system, or directly to other components (e.g., the compressor, receiver or evaporator.

Thus, as described above, the present invention provides a new and useful technique for attaching a fluid tube to a block valve in a fluid tight manner. The technique of the present invention requires only a single machining step, eliminates material waste associated with other techniques.

There are no separate components, which reduces machining, material and stock-keeping costs. The staking is also an environmentally "friendly" step, as there is no generated emissions or wasted material.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A block valve including a body and power element comprising a diaphragm mounted a domed head and a support cup on the valve body, a charge located within a head chamber defined by the domed head and one surface of the diaphragm, the support cup and another surface of the diaphragm defining a diaphragm chamber with the body of the expansion valve, a valve stem extending from the diaphragm through a bore in the valve body to the valve element modulating a valve orifice between a first port in the valve body and a second port in the valve body; a return passage through the valve body from the third port to a forth port, and in fluid communication with the diaphragm chamber;

a refrigerant tube received in one of said port in said valve body and having a fluid-tight seal therewith, said refrigerant tube including a annular bead extending around the exterior of the tube in a direction transverse to the axis of the tube, said one port defined by the axis bore, and a first counterbore co-axial with said bore and formed inwardly from a surface of the body, said bore and first counterbore defining an inner shoulder, said refrigerant tube being received in said bore with said being closely received within said first counterbore and engaging said inner shoulder uniformly around the circumference of the tube;

a deformed portion of said valve body surrounding the opening to said bore on said surface in forced engagement whit said bead without an external fastener so as to secure the tube to the valve body in fluid-tight relation therewith.

2. The block valve as in claim 1, wherein said portion of said valve body surrounding the bore is mechanically formed around the bead and at least partially encloses the bead within the first counterbore.

3. The block valve as in claim 2, wherein said shoulder defines a sharp edge, said edge being forced against a concave junction between said refrigerant tube and said bead to provide a fluid-tight seal.

4. The block valve as claim in claim 3, wherein said bore further includes a second counterbore co-axial with said first counterbore and extending from said first counterbore into said valve body, a distal end of said refrigerant tube being closely received within said second counterbore.

5. The thermostatic expansion valve including a body having a first, inlet port for receiving refrigerant from the condenser; a second, outlet port for providing refrigerant to the evaporator, a valve assembly for modulating a valve orifice between said first and second ports; a third, inlet port for receiving refrigerant from the evaporator; a fourth, outlet port for providing refrigerant to a compressor, and power element sensitive to the refrigerator flowing between the third and forth ports and operatively connected to the valve assembly;

a refrigerant tube received in one of said ports in said valve body and having a fluid-tight seal therewith, said refrigerant tube including an annular bead extending around the exterior of the tube in a direction transverse to the axis of the tube, said one port defined by an axial bore, and a first counterbore co-axial with said bore and formed inwardly from a surface of the body, said bore and first counterbore defining an inner shoulder, said refrigerant tube being received in said bore with said bead being closely received within said first counterbore;

a deformed portion of said valve body surrounding the opening to bore on said surface in forced engagement with said bead without an external fastener so as to secure the tube to the valve body in fluid-tight relation therewith.

* * * * *

UNITED STATES PATENT AND TRADEMARK OFFICE
CERTIFICATE OF CORRECTION

PATENT NO. : 6,868,684 B2  Page 1 of 1
APPLICATION NO. : 10/729079
DATED : March 22, 2005
INVENTOR(S) : Law, Scott P. and Petrosino, Frank L.

It is certified that error appears in the above-identified patent and that said Letters Patent is hereby corrected as shown below:

Title Page;

Section [75], Should read;

>Scott P. Law, Newark, NY (U.S.)
>Frank L. Petrosino, Vanzago (IT)
>Daniel R, Rice, Lyons, NY (U.S.)

Signed and Sealed this

Fifth Day of September, 2006

JON W. DUDAS
*Director of the United States Patent and Trademark Office*